(12) United States Patent
Chang

(10) Patent No.: US 9,946,364 B2
(45) Date of Patent: Apr. 17, 2018

(54) MATCHING METHOD OF WIRELESS CHARGING MOUSE

(71) Applicants: DEXIN ELECTRONIC LTD., Dongguan, Guangdong (CN); DEXIN CORPORATION, New Taipei (TW)

(72) Inventor: Yuan-Jung Chang, New Taipei (TW)

(73) Assignees: DEXIN ELECTRONIC LTD., Dongguan, Guangdong (CN); DEXIN CORPORATION, New Taipei (TW)

( * ) Notice: Subject to any disclaimer, the term of this patent is extended or adjusted under 35 U.S.C. 154(b) by 154 days.

(21) Appl. No.: 15/173,307

(22) Filed: Jun. 3, 2016

(65) Prior Publication Data

US 2017/0351348 A1    Dec. 7, 2017

(51) Int. Cl.
*H02J 7/00* (2006.01)
*H02J 7/02* (2016.01)
*G06F 3/0354* (2013.01)
*H02J 50/12* (2016.01)

(52) U.S. Cl.
CPC .......... *G06F 3/03543* (2013.01); *H02J 7/025* (2013.01); *H02J 50/12* (2016.02)

(58) Field of Classification Search
CPC ....................................................... H02J 7/025
USPC ........................................................ 320/108
See application file for complete search history.

(56) References Cited

U.S. PATENT DOCUMENTS

| 2016/0197494 | A1* | 7/2016 | Kwon | .................. | H04B 5/0037 |
| | | | | | 307/104 |
| 2016/0301243 | A1* | 10/2016 | Zeine | ..................... | G09G 5/003 |

* cited by examiner

*Primary Examiner* — Edward Tso
*Assistant Examiner* — Ahmed Omar
(74) *Attorney, Agent, or Firm* — Li & Cai Intellectual Property (USA) Office

(57) ABSTRACT

Disclosed is a matching method for a wireless charging mouse, comprising: receiving an electromagnetic energy; building a matching transmission channel at a matching address predetermined, and transmitting a first matching signal to an electric device through the matching transmission channel; receiving the first matching signal and transmitting a first response signal through the matching transmission channel, and generating a first communication address by the electric device; receiving the first response signal and again transmitting the first matching signal to the electric device through the matching transmission channel; again receiving the first matching signal and transmitting a second response signal and the first communication address by the electric device through the matching transmission channel; and storing the first communication address and the wireless charging mouse and the electric device entering a data transmission mode.

12 Claims, 7 Drawing Sheets

MATCHING METHOD OF WIRELESS CHARGING MOUSE

BACKGROUND OF THE INVENTION

1. Field of the Invention

The instant disclosure relates to a matching method of a wireless charging mouse; in particular, to a matching method that can automatically match a wireless charging mouse with an electric device.

2. Description of Related Art

A cursor on a computer screen can be easily controlled by using a mouse, wherein the movement of the cursor on the screen corresponds to the displacement and the moving direction of the mouse. In recent years, the displacement and the moving direction of the mouse are detected by the optical mechanism instead of the traditional mechanical roller, which can increase the accuracy of mouse detection. As the technology develops, the wireless charging is being used in a mouse. Usually, to establish a connection between a wireless mouse and an electric device, a product serial number of the wireless mouse needs to be identified by a driving program.

SUMMARY OF THE INVENTION

The instant disclosure provides a matching method for a wireless charging mouse. Before the wireless charging mouse starts to transmit data to an electric device, the wireless charging mouse and the electric device work in a matching mode and the matching method is executed. The matching method for the wireless charging mouse comprises: receiving an electromagnetic energy by the wireless charging mouse wherein the electromagnetic energy is generated from a charging board; building a matching transmission channel by the wireless charging mouse at a matching address predetermined according to the electromagnetic energy, and transmitting a first matching signal to the electric device by the wireless charging mouse through the matching transmission channel; receiving the first matching signal and transmitting a first response signal to the wireless charging mouse by the electric device through the matching transmission channel, and generating a first communication address by the electric device; receiving the first response signal and again transmitting the first matching signal by the wireless charging mouse to the electric device through the matching transmission channel; again receiving the first matching signal and transmitting a second response signal and the first communication address to the wireless charging mouse by the electric device through the matching transmission channel; and storing the first communication address by the wireless charging mouse and the wireless charging mouse and the electric device entering a data transmission mode.

For further understanding of the instant disclosure, reference is made to the following detailed description illustrating the embodiments of the instant disclosure. The description is only for illustrating the instant disclosure, not for limiting the scope of the claim.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION OF PREFERRED EMBODIMENTS

Figure 1A:
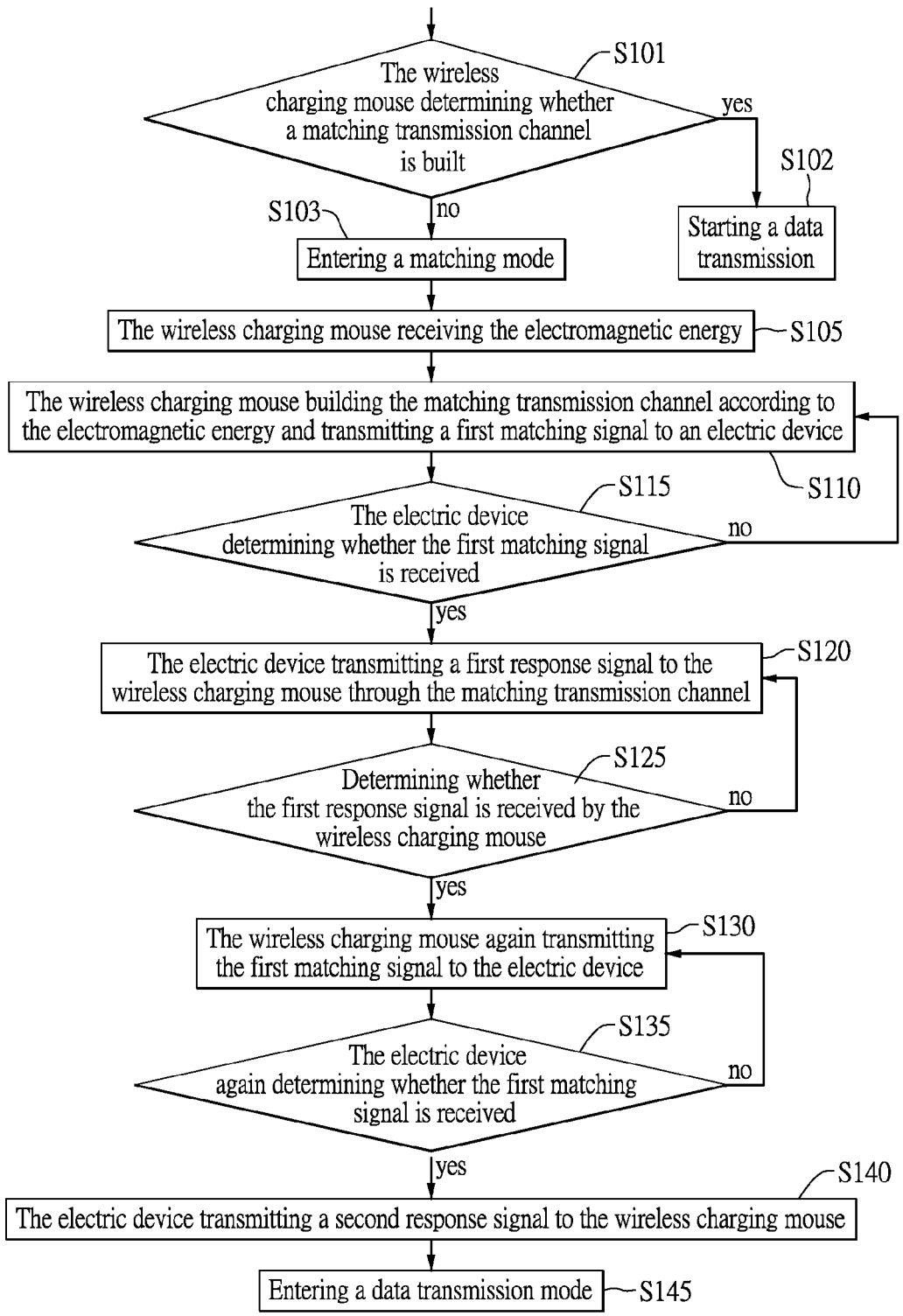
FIG. 1A and FIG. 1B show flow charts of a matching method for a wireless charging mouse of one embodiment of the instant disclosure.
Figure 2:
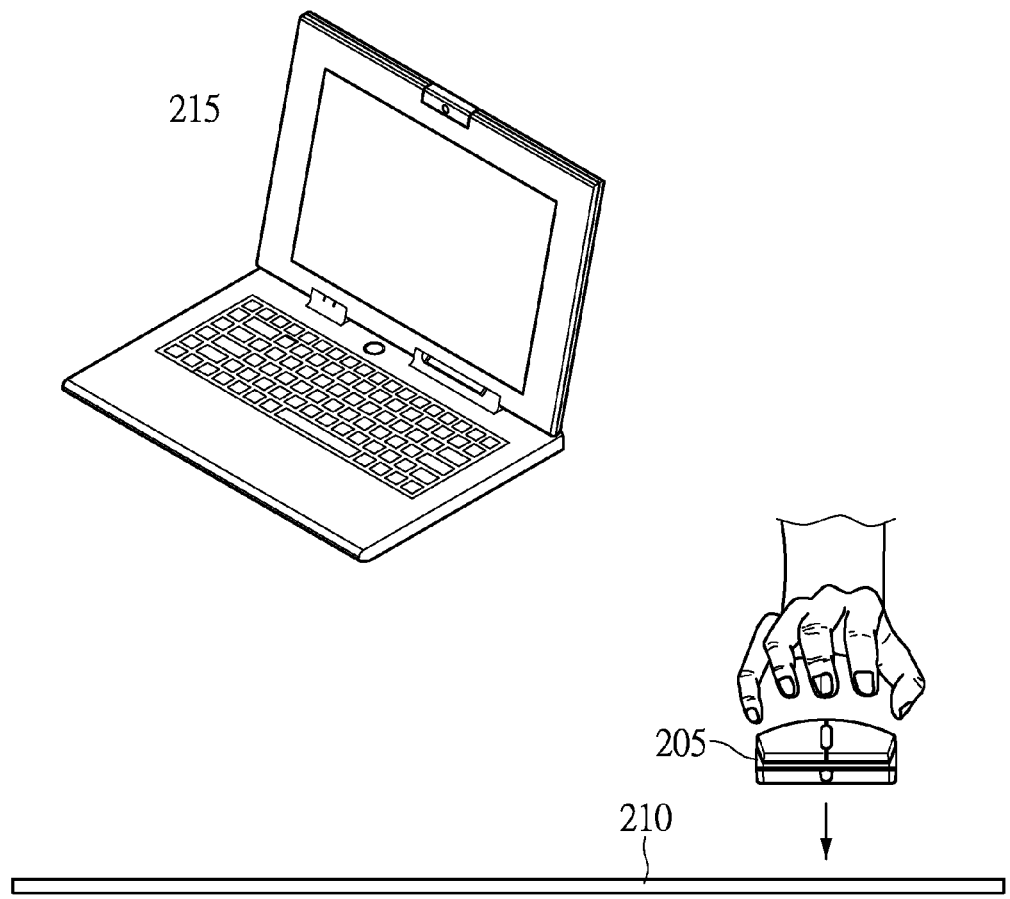
FIG. 2 shows a schematic diagram of a wireless charging mouse that is matching with an electric device in one embodiment of the instant disclosure.

Refer to FIG. 1A and FIG. 2. FIG. 1A shows a flow chart of a matching method for a wireless charging mouse of one embodiment of the instant disclosure, and FIG. 2 shows a schematic diagram of a wireless charging mouse that is matching with an electric device in one embodiment of the instant disclosure.

In step S101, the wireless charging mouse 205 determines whether a data transmission channel has been built. If yes, it goes to step S102. In step S102, the wireless charging mouse 205 and the electric device 215 transmit data according to a preset communication address. If no, it goes to step S103. In step S103, the wireless charging mouse 205 and the electric device 215 start to work in a matching mode.

In step S105, the wireless charging mouse 205 receives electromagnetic energy generated by the charging board 210. When a user puts the wireless charging mouse 205 close to the charging board 210, a resonant coil (not shown) of the wireless charging mouse 205 and a resonant coil (not shown) of the charging board 210 are electromagnetically coupled, so that the wireless charging mouse 205 can receive the electromagnetic energy generated by the charging board 210. After that, a converting circuit (not shown) of the wireless charging mouse 205 converts the electromagnetic energy to electric energy and provides the electric energy to a rechargeable battery (not shown) of the wireless charging mouse 205.

In step S110, the wireless charging mouse 205 builds a matching transmission channel according to the received electromagnetic energy for transmitting a first matching signal to the electric device. Specifically speaking, after the wireless charging mouse 205 receives the electromagnetic energy generated by the charging board 210, a communication circuit (not shown) of the wireless charging mouse 205 is triggered by the electromagnetic energy to build a matching transmission channel at a matching address predetermined according to the electromagnetic energy. Through the matching transmission channel, the wireless charging mouse 205 transmits a first matching signal having a first RF transmission strength to the electric device 215. The electric device 215 can be, for example, a laptop, a tablet, a personal computer or the like, and it is not limited herein. In addition, the wireless charging mouse 205 stores a plurality of matching addresses. After the wireless charging mouse 205 receives the electromagnetic energy, the communication circuit of the wireless charging mouse 205 is triggered to pick up one of the matching addresses for transmitting a first matching signal based on a first RF transmission strength to the electric device 215. Different RF transmission strengths make the first matching signal transmit over different distances. After the wireless charging mouse 205 picks up one of the matching addresses and decides the RF transmission strength of the first matching signal, the first matching signal is transmitted to the electric device 215 by the wireless charging mouse 205.

In step S115, the electric device 215 determines whether the first matching signal has been received. If yes, it goes to step S120. If no, it returns to step S110. In the step S110, the electric device 215 keeps waiting for the first matching signal transmitted by the wireless charging mouse 205. In other words, if the electric device 215 has not received the first matching signal transmitted by the wireless charging mouse 205, the wireless charging mouse 205 transmits the first matching signal to the electric device 215 again.

In step S120, the electric device 215 transmits a first response signal to the wireless charging mouse 205 through the matching transmission channel. Specifically speaking, after the electric device 215 receives the first matching signal transmitted based on the first RF transmission strength by the wireless charging mouse 205 through the matching transmission channel, the electric device 215 transmits a first response signal based on a second RF transmission strength to the wireless charging mouse 205 through the matching transmission channel and also generates a first communication address. The electric device 215 stores the first communication address in a first-in-first-out register.

In step S125, the wireless charging mouse 205 determines whether the first response signal has been received. If yes, it goes to step S130. If no, it returns to step S120. In step S120, the wireless charging mouse 205 keeps waiting for the first response signal transmitted by the electric device 215. In other words, if the wireless charging mouse 205 has not received the first response signal transmitted by the electric device 215, the electric device 215 transmits the first response signal to the wireless charging mouse 205 again.

In step S130, the wireless charging mouse 205 again transmits the first matching signal to the electric device 215. Specifically speaking, after the wireless charging mouse 205 has received the first response signal transmitted by the electric device 215, the wireless charging mouse 205 again transmits the first matching signal based on the first RF transmission strength to the electric device 215 through the matching transmission channel.

In step S135, the electric device 215 determines whether the first matching signal has again been received. If yes, it goes to step S140. If no, it returns to step S130. In step S130, the electric device 215 keeps waiting for the first matching signal to again be transmitted by the wireless charging mouse 205. It should be noted that, if the electric device 215 does not again receive the first matching signal transmitted by the wireless charging mouse 205, it may be the result of an insufficient power supply, communication interferences or other factors.

In step S140, the electric device 215 transmits a second response signal to the wireless charging mouse 205. Specifically speaking, after the electric device 215 again has received the first matching signal transmitted by the wireless charging mouse 205, the electric device 215 is triggered to generate a second response signal. The electric device 215 transmits the second response signal based on a second RF transmission strength to the wireless charging mouse 205 through the matching transmission channel. In the meantime, the electric device 215 transmits the first communication address stored in the first-in-first-out register to the wireless charging mouse 205.

In step S145, the electric device 215 and the wireless charging mouse 205 enter a data transmission mode. Specifically speaking, after the wireless charging mouse 205 has received the second response signal transmitted by the electric device 215, the wireless charging mouse 205 stores the first communication address and builds a first transmission channel at the first communication address. After that, the electric device 215 and the wireless charging mouse 205 enter a data transmission mode. In other words, they start to transmit data through the first transmission channel built at the first communication address. In addition, the wireless charging mouse 205 can have an indicator lamp (not shown). When the wireless charging mouse 205 works in the matching mode, the indicator lamp flashes; for example, it flashes and emits the red light. After the electric device 215 and the wireless charging mouse 205 enter the data transmission mode, the indicator lamp emits the green light to indicate that the wireless connection is working well. However, it is not limited herein. In addition, the wireless charging mouse 205 can also have a reset button (not shown). After a user has pushed the reset button for 3 seconds, the wireless charging mouse 205 automatically deletes the first communication address previously picked and the first transmission channel that has been built, to save the memory of the wireless charging mouse 205 for data storage.

Figure 1B:
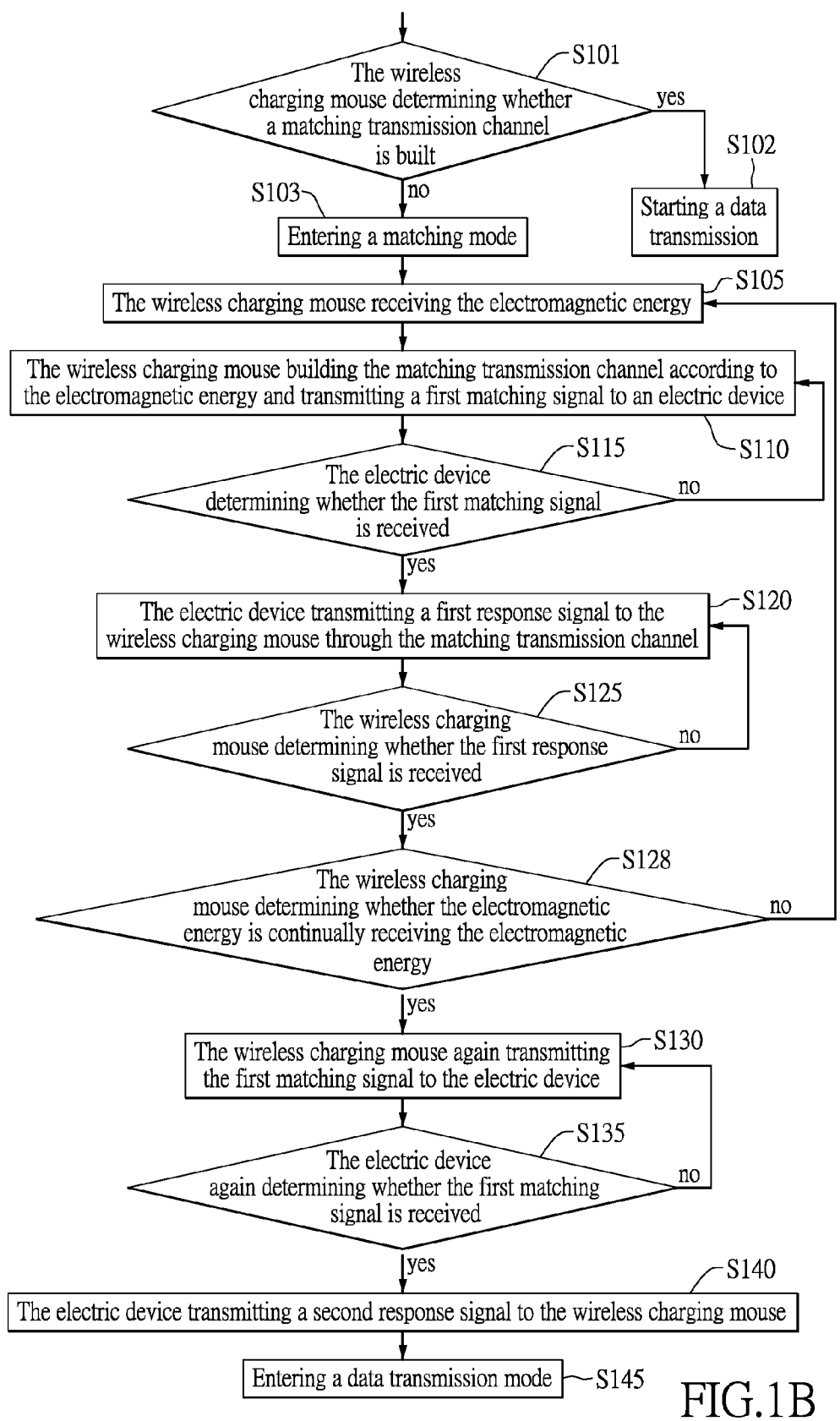

Refer to FIG. 1B and FIG. 2. FIG. 1B shows a flow chart of a matching method for a wireless charging mouse of another embodiment of the instant disclosure. The difference between the matching methods shown in FIG. 1A and FIG. 1B is that there is a step S128 added in the matching method shown in FIG. 1B. Except for step S128, the steps of the matching method shown in FIG. 1A and FIG. 1B are the same. After the wireless charging mouse 205 receives the first response signal transmitted by the electric device 215, it goes to step S128. In step S128, the electric device 215 determines whether to continually receive the electromagnetic energy generated by the charging board 210. If yes, it goes to step S130. If no, it returns to step S105. In step S105, the wireless charging mouse 205 keeps waiting to receive electromagnetic energy generated by the charging board 210.

Figure 3A:
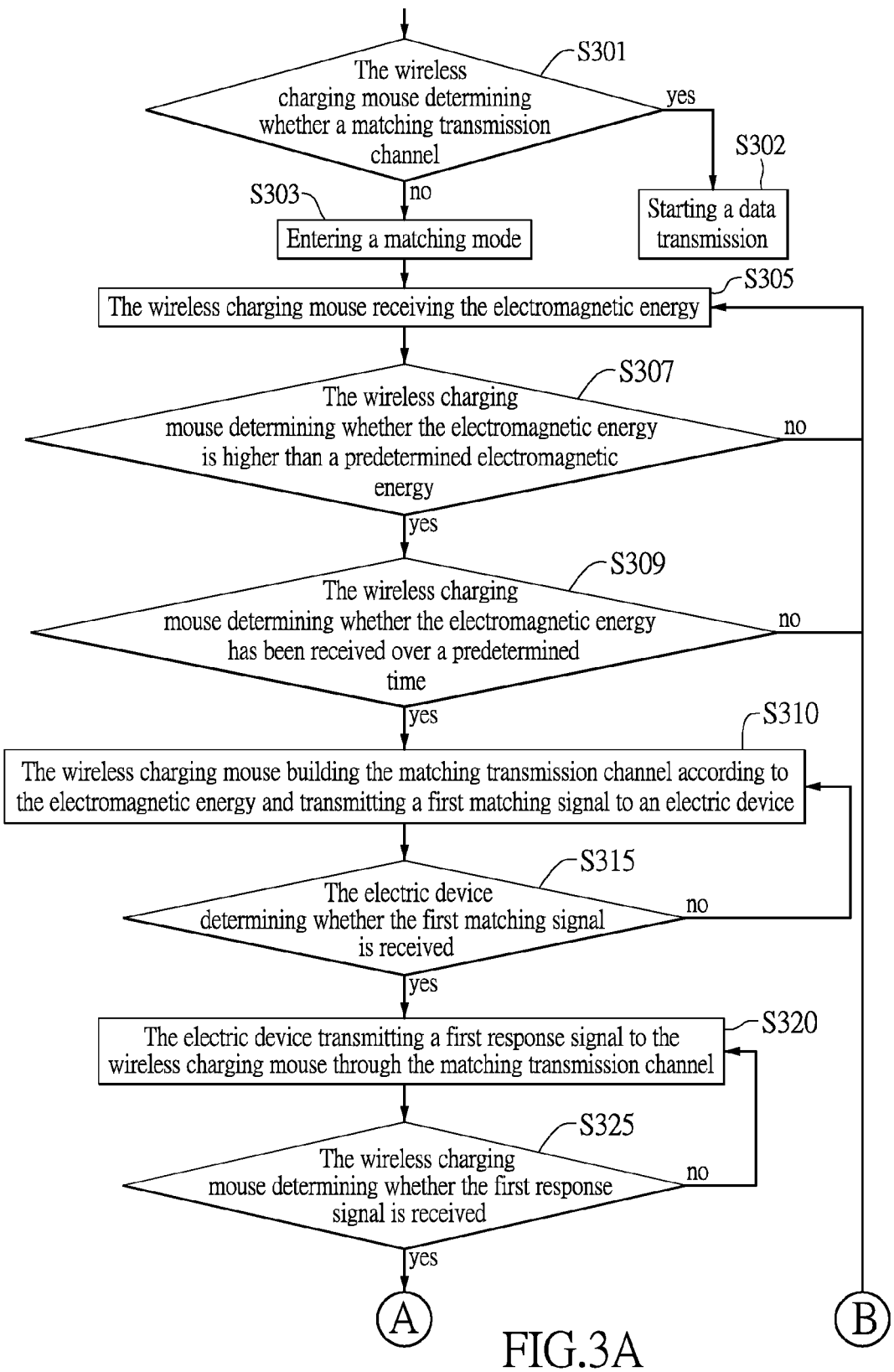
FIG. 3A and FIG. 3B show flow charts of a matching method for a wireless charging mouse of another embodiment of the instant disclosure.
Figure 3B:
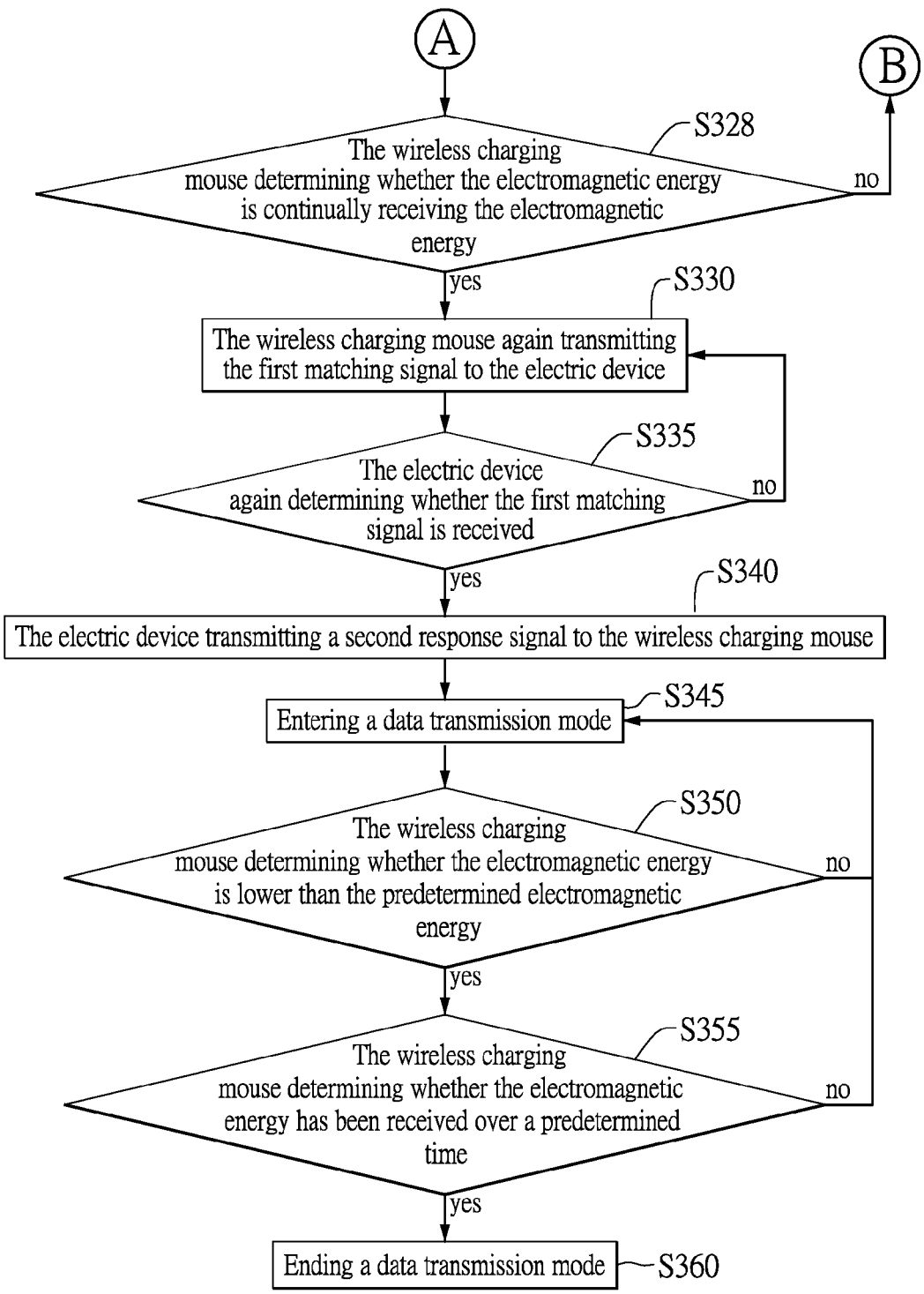

Refer to FIG. 2, FIG. 3A and FIG. 3B. FIG. 3A and FIG. 3B show flow charts of a matching method for a wireless charging mouse of another embodiment of the instant disclosure. Compared with the matching methods shown in FIG. 1A and FIG. 1B, in the matching methods shown in FIG. 3A and FIG. 3B, the magnitude of the received electromagnetic energy and the time for receiving the electromagnetic energy are taken into account. Steps S301~S305 correspond to steps S101~S105.

In step S307, if the wireless charging mouse 205 determines that the electromagnetic energy generated by the charging board 210 is higher than a predetermined electromagnetic energy, it goes to step S309. If the wireless charging mouse 205 determines that the electromagnetic energy generated by the charging board 210 is lower than the predetermined electromagnetic energy, it returns to step S305. In step S305, the wireless charging mouse 205 keeps waiting to receive electromagnetic energy generated by the charging board 210, and waiting for the received electromagnetic energy generated by the charging board 210 to be higher than the predetermined electromagnetic energy. It should be easily understood by those skilled in the art that, the energy magnitude of the electromagnetic energy is inversely proportional to the transmission distance of the electromagnetic energy. In other words, the closer one is to an electromagnetic energy source, the higher the electromagnetic energy that one can receive will be. On the contrary, the more distant one is from an electromagnetic energy source, the lower the electromagnetic energy that one can receive will be. Thus, by determining the magnitude of the electromagnetic energy received by the wireless charging mouse 205, it can be known whether the wireless charging mouse 205 has been put on the charging board 210 or is close to the charging board 210. For example, the wireless charging mouse 205 may be only 3 cm from to the charging board 210.

In step S309, if the wireless charging mouse 205 determines that the electromagnetic energy received by the wireless charging mouse 205 has been lower than the predetermined electromagnetic energy over a predetermined time, it goes to step S310. If the wireless charging mouse 205 determines that the electromagnetic energy received by the wireless charging mouse 205 has not been lower than the predetermined electromagnetic energy over the predetermined time, it returns to step S305. In step S305, the wireless charging mouse 205 keeps waiting to again receive electromagnetic energy generated by the charging board 210. In step S309, the wireless charging mouse 205 is triggered to build a matching transmission channel, after it is determined that the wireless charging mouse 205 has been put onto or close to the charging board 210 over the predetermined time. Thus, if the wireless charging mouse 205 is moved by a user only for a short while, the wireless charging mouse 205 will not try to start a matching mode with the electric device 215, which is power-saving. It should be noted that steps S310~S345 correspond to steps S101~S145.

In step S350, the wireless charging mouse 205 determines whether the received electromagnetic energy is lower than the predetermined electromagnetic energy. Specifically speaking, if the received electromagnetic energy generated by the charging board 210 is lower than the predetermined electromagnetic energy, it goes to step S355. If the received electromagnetic energy from the charging board 210 is higher than the predetermined electromagnetic energy, it returns to step S345. In step S345, the wireless charging mouse 205 and the electric device 215 keeps working in the data transmission mode.

In step S355, the wireless charging mouse 205 determines whether the received electromagnetic energy generated by the charging board 210 has been lower than the predetermined electromagnetic energy for a predetermined time. If yes, it goes to step S360. In step S360, the wireless charging mouse 205 and the electric device 215 end the data transmission mode. If no, it returns to step S345. In step S345, the wireless charging mouse 205 and the electric device 215 keeps working in the data transmission mode. Step S355 prevents the wireless charging mouse 205 and the electric device 215 from ending the data transmission mode because a user inadvertently moves the wireless charging mouse 205 only for a short time.

Figure 4A:
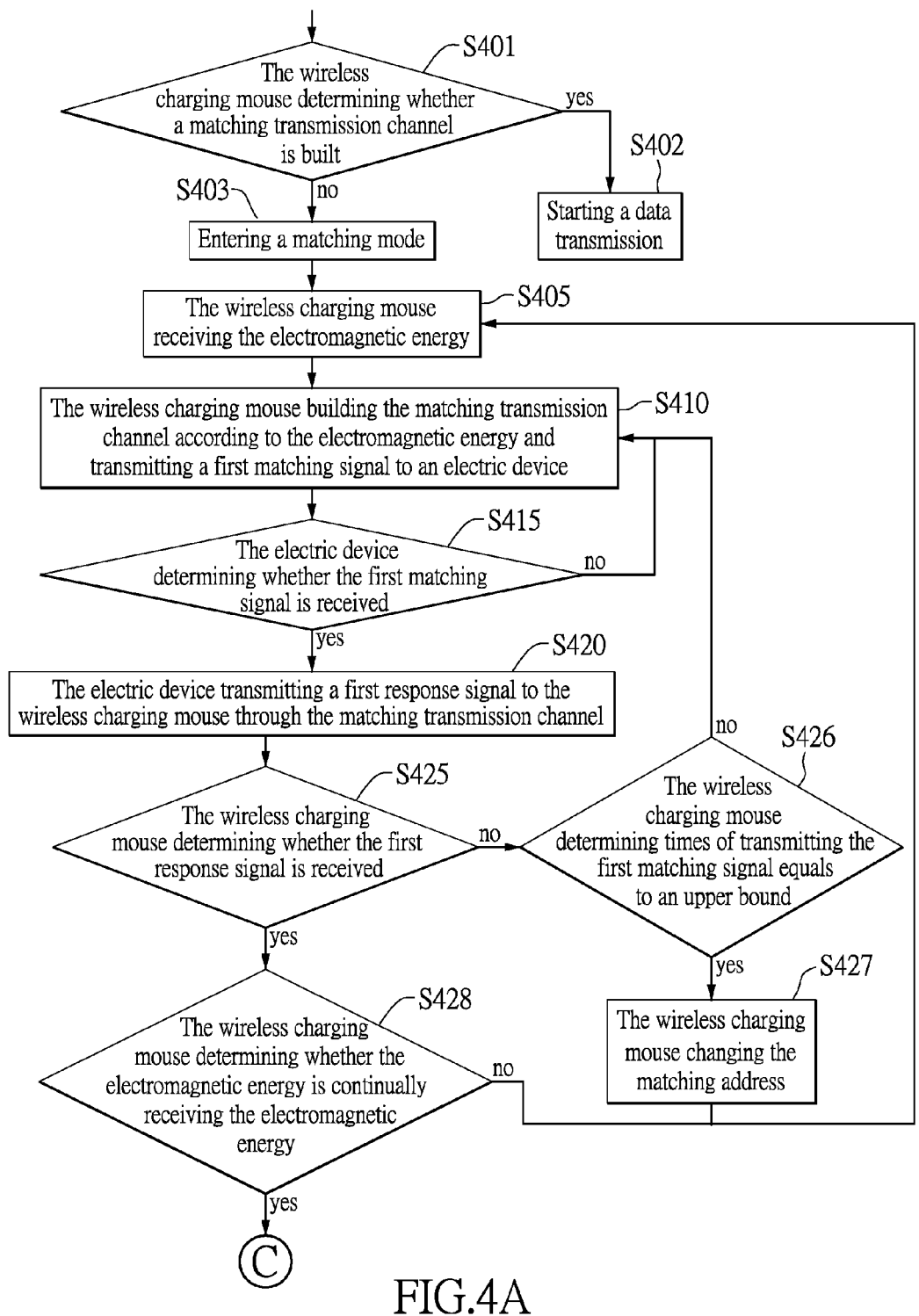
FIG. 4A and FIG. 4B show flow charts of a matching method for a wireless charging mouse of still another embodiment of the instant disclosure.
Figure 4B:
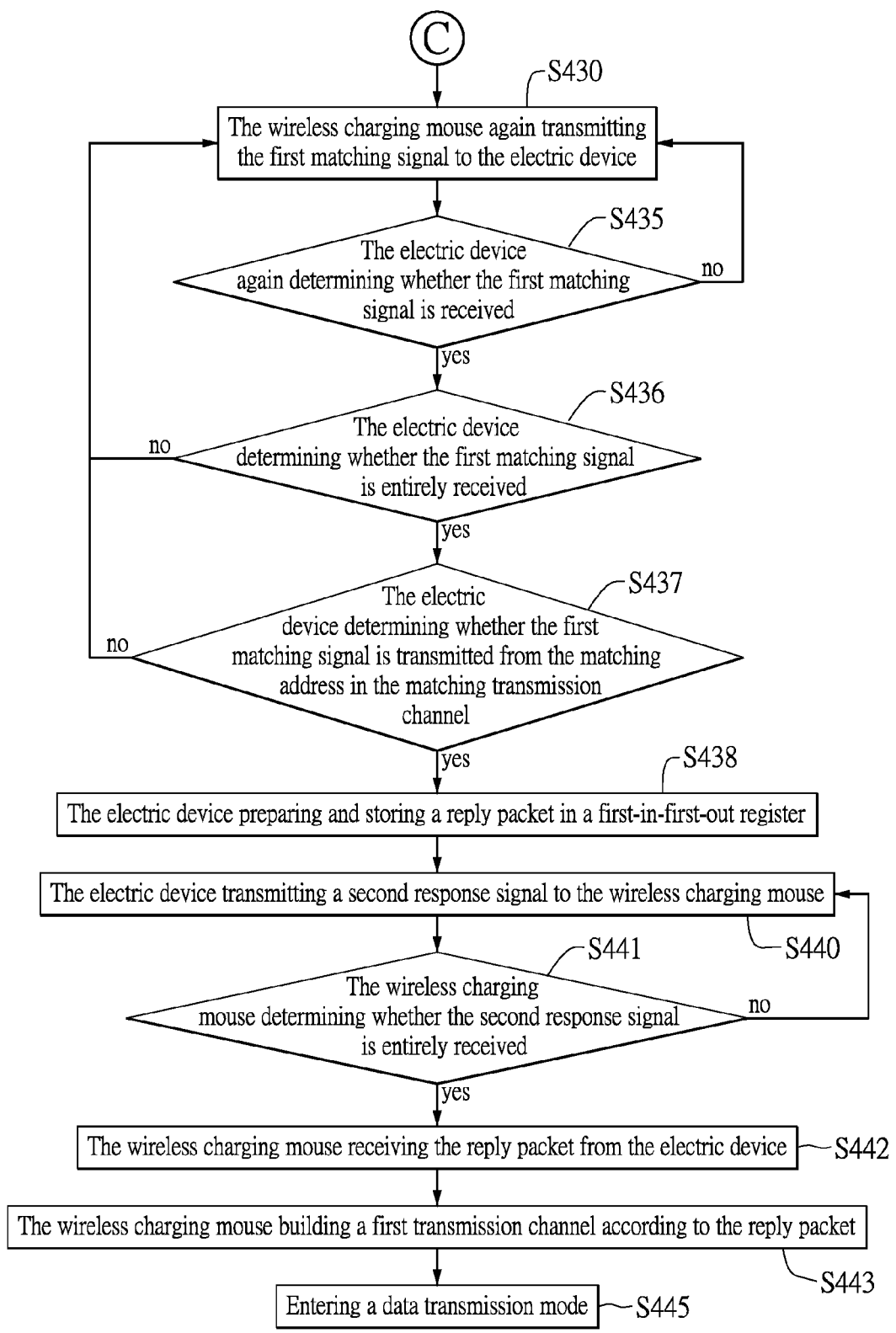

Refer to FIG. 2, FIG. 4A and FIG. 4B. FIG. 4A and FIG. 4B show flow charts of a matching method for a wireless charging mouse of still another embodiment of the instant disclosure. It should be noted that, steps S401~S420 correspond to steps S101~S120.

In step S425, the wireless charging mouse 205 determines whether a first response signal is received. Specifically speaking, if the wireless charging mouse 205 receives the first response signal transmitted by the electric device 215, it goes to step S428. If the wireless charging mouse 205 has not received the first response signal transmitted by the electric device 215, it returns to step S426.

In step S426, the wireless charging mouse 205 determines whether the times of transmitting the first matching signal by the wireless charging mouse 205 equals to an upper bound. If the times of transmitting the first matching signal by the wireless charging mouse 205 have not yet been equal to the upper bound, it returns to step S410. In step S410, the wireless charging mouse 205 again transmits a first matching signal to the electric device 215. On the other hand, if the times of transmitting the first matching signal by the wireless charging mouse 205 are equal to the upper bound, the wireless charging mouse 205 temporarily stops transmitting the first matching signal to the electric device 215, and it goes to step S427. In step S427, the wireless charging mouse 205 changes the matching address. After that, it goes to step S405. In step S405, the wireless charging mouse 205 waits to be triggered by electromagnetic energy generated by the charging board 210.

In step S428, the wireless charging mouse 205 determines whether to continually receive the electromagnetic energy generated by the charging board 210. If yes, it goes to step S430. If no, it returns to step S405. In step S405, the wireless charging mouse 205 keeps waiting to receive electromagnetic energy generated by the charging board 210.

In step S430, the wireless charging mouse 205 again transmits the first matching signal to the electric device 215. In step S435, the electric device 215 determines whether the first matching signal has again been received. If yes, it goes to step S436. If no, it returns to step S430. In step S430, the wireless charging mouse 205 again transmits a first matching signal to the electric device 215.

In step S436, the electric device 215 determines whether the first matching signal has been entirely received. If yes, it goes to step S437. If no, it returns to step S430, and in step S430, the wireless charging mouse 205 again transmits a first matching signal to the electric device 215. In addition, the electric device 215 can comprise a communication circuit, to check whether the first matching signal has been entirely received by the wireless charging mouse 205.

In step S437, the electric device 215 determines whether the first matching signal has been transmitted from the matching address in the matching transmission channel. If yes, it goes to step S438. If no, it returns to step S430. In step S430, the wireless charging mouse 205 again transmits a first matching signal to the electric device 215. If the electric device 215 determines that the first matching signal has been transmitted from the matching address in the matching transmission channel, it indicates that the electric device 215 has again received the first matching signal.

In step S438, the electric device 215 prepares a reply packet and stores the reply packet in its first-in-first-out register. Specifically speaking, when the electric device 215 again receives the first matching signal, the electric device 215 prepares a reply packet and stores the reply packet in its first-in-first-out register, wherein the reply packet comprises the first communication address. The first-in-first-out register of the electric device 215 can be implemented by any electric element having data storage function, and it is not limited herein.

In step S440, the electric device 215 transmits a second response signal to the wireless charging mouse 205. In step S441, the wireless charging mouse 205 determines whether the second response signal has been entirely received. If yes, it goes to step S442. If no, it returns to step S440, and in step S440, the electric device 215 again transmits a second response signal to the wireless charging mouse 205.

In step S442, the wireless charging mouse 205 receives the reply packet transmitted by the electric device 215. Specifically speaking, when the second response signal has been entirely received by the wireless charging mouse 205, the wireless charging mouse 205 also receives the reply packet previously stored in the first-in-first-out register of the electric device 215.

In step S443, the wireless charging mouse 205 builds a first transmission channel according to the reply packet. Specifically speaking, after the wireless charging mouse 205 receives the reply packet, the wireless charging mouse 205 obtains the first communication address from the reply packet. The wireless charging mouse 205 stores the first communication address and builds a first transmission channel at the first communication address. In step S445, the wireless charging mouse 205 and the electric device 215 start to work in the data transmission mode. When the wireless charging mouse 205 and the electric device 215 are working in the data transmission mode, the wireless charging mouse 205 transmits a data signal from the first communication address based on a third RF transmission strength to the electric device 215. On the other hand, the electric device 215 transmits another data signal from the first communication address based on a fourth RF transmission strength to the wireless charging mouse 205. It should be noticed that, the third RF transmission strength is larger than the first RF transmission strength, and the fourth RF transmission strength is larger than the second RF transmission strength. In detail, the first RF transmission strength is the smallest RF transmission strength based on which the wireless charging mouse 205 transmits signals, and the third transmission strength is the largest RF transmission strength based on which the wireless charging mouse 205 transmits signals. The second RF transmission strength is the smallest RF transmission strength based on which the electric device 215 transmits signals, and the fourth transmission strength is the largest RF transmission strength based on which the electric device 215 transmits signals. When the wireless charging mouse 205 and the electric device 215 are working in the matching mode, they need to be closer to each other to prevent signal interference between the wireless charging mouse 205 and other electric products. When the wireless charging mouse 205 and the electric device 215 are working in the data transmission mode, a user can use the wireless charging mouse 205 within a certain range of distance as long as signals can be effectively transmitted between the wireless charging mouse 205 and the electric device 215.

To sum up, in the matching method of a wireless charging mouse provided by the instant disclosure, the wireless charging mouse can be triggered by an electromagnetic energy generated by the charging board to build a transmission channel. After that, by the matching signal and the response signal it can be determined whether the wireless charging mouse and the electric device have started to work in a data transmission mode. By this matching method, even when the wireless charging mouse is put on a charging board for charging for a very short time, the wireless charging mouse and electric device can quickly be wirelessly connected without installing and setting a driving program.

The descriptions illustrated supra set forth simply the preferred embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:

1. A matching method for a wireless charging mouse, used in a matching mode of the wireless charging mouse and an electric device, comprising:

receiving electromagnetic energy by the wireless charging mouse wherein the electromagnetic energy is generated from a charging board;

building a matching transmission channel by the wireless charging mouse at a matching address predetermined according to the electromagnetic energy, and transmitting a first matching signal to the electric device by the wireless charging mouse through the matching transmission channel;

receiving the first matching signal and transmitting a first response signal to the wireless charging mouse by the electric device through the matching transmission channel, and generating a first communication address by the electric device;

receiving the first response signal and again transmitting the first matching signal by the wireless charging mouse to the electric device through the matching transmission channel;

again receiving the first matching signal and transmitting a second response signal and the first communication address to the wireless charging mouse by the electric device through the matching transmission channel; and storing the first communication address by the wireless charging mouse and the wireless charging mouse and the electric device entering a data transmission mode.

2. The matching method for the wireless charging mouse according to claim 1, wherein the wireless charging mouse builds the matching transmission channel according to the electromagnetic energy received from the charging board when the wireless charging mouse and the charging board are electromagnetically coupled.

3. The matching method for the wireless charging mouse according to claim 1, further comprising:
triggering the wireless charging mouse to build the matching transmission channel when the electromagnetic energy received by the wireless charging mouse is higher than a predetermined electromagnetic energy.

4. The matching method for the wireless charging mouse according to claim 1, further comprising:
triggering the wireless charging mouse to build the matching transmission channel when the wireless charging mouse has received the electromagnetic energy over a predetermined time.

5. The matching method for the wireless charging mouse according to claim 1, further comprising:
ending the data transmission mode when the electromagnetic energy received by the wireless charging mouse has been lower than a predetermined electromagnetic energy over a predetermined time.

6. The matching method for the wireless charging mouse according to claim 1, further comprising:
determining whether times of transmitting the first matching signal by the wireless charging mouse equals to an upper bound if the wireless charging mouse does not receive the first response signal transmitting by the electric device;
again transmitting the first matching signal to the electric device by the wireless charging mouse if the times of transmitting the first matching signal by the wireless charging mouse are less than the upper bound; and
temporarily stopping transmitting the first matching signal to the electric device by the wireless charging mouse and changing the matching address by the wireless charging mouse if the times of transmitting the first matching signal by the wireless charging mouse equal to the upper bound, wherein the wireless charging mouse waits to be again triggered by the electromagnetic energy generated by the charging board.

7. The matching method for the wireless charging mouse according to claim 1, further comprising:

the wireless charging mouse waiting to be again triggered by the second response signal when receiving the first response signal transmitted by the electric device;

the electric device determining whether the first matching signal has been entirely received;

the electric device determining whether the first matching signal has been transmitted from the matching address in the matching transmission channel when the first matching signal has been entirely received;

wherein the electric device has again received the first matching signal when it is determined that the first matching signal has been transmitted from the matching address in the matching transmission channel; and the electric device preparing a reply packet when again receiving the first matching signal and storing the reply packet in its first-in-first-out register, wherein the reply packet comprises the first communication address.

8. The matching method for the wireless charging mouse according to claim 7, further comprising:

the wireless charging mouse also receiving the reply packet stored in the first-in-first-out register if it has received the second response signal transmitted by the electric device; and the wireless charging mouse obtaining the first communication address from the reply packet, storing the first communication address and building a first transmission channel at the first communication address.

9. The matching method for the wireless charging mouse according to claim 1, wherein the wireless charging mouse transmits the first matching signal based on a first RF transmission strength to the electric device through the matching transmission channel after building the matching transmission channel, and the electric device transmits the first response signal based on a second RF transmission strength to the wireless charging mouse through the matching transmission channel after receiving the first matching signal.

10. The matching method for the wireless charging mouse according to claim 9, wherein the wireless charging mouse again transmits the first matching signal based on the first RF transmission strength to the electric device through the matching transmission channel after receiving the first response signal, and the electric device transmits the second response signal and the first communication address based on the second RF transmission strength to the wireless charging mouse through the matching transmission channel after again receiving the first matching signal.

11. The matching method for the wireless charging mouse according to claim 10, wherein the wireless charging mouse transmits a data signal from the first communication address based on a third RF transmission strength to the electric device, and the electric device transmits another data signal from the first communication address based on a fourth RF transmission strength to the wireless charging mouse, after the wireless charging mouse and the electric device enter the data transmission mode.

12. The matching method for the wireless charging mouse according to claim 11, wherein the third RF transmission strength is larger than the first RF transmission strength and the fourth RF transmission strength is larger than the second RF transmission strength.

* * * * *